(12) United States Patent
Akiyoshi et al.

(10) Patent No.: US 10,851,888 B2
(45) Date of Patent: Dec. 1, 2020

(54) HYDRAULIC CONTROL DEVICE AND HYDRAULIC CONTROL METHOD OF TRANSMISSION

(71) Applicant: Honda Motor Co., Ltd., Tokyo (JP)

(72) Inventors: Norihiro Akiyoshi, Saitama (JP); Kohei Sakai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/354,139

(22) Filed: Mar. 14, 2019

(65) Prior Publication Data

US 2019/0285171 A1  Sep. 19, 2019

(30) Foreign Application Priority Data

Mar. 15, 2018 (JP) ................................. 2018-048121

(51) Int. Cl.
*F16H 59/70* (2006.01)
*F16H 59/74* (2006.01)
(Continued)

(52) U.S. Cl.
CPC ..... *F16H 61/0031* (2013.01); *F16H 61/0251* (2013.01); *F16H 63/3483* (2013.01);
(Continued)

(58) Field of Classification Search
CPC ........... F16H 2059/708; F16H 61/0031; F16H 2059/746
See application file for complete search history.

(56) References Cited

U.S. PATENT DOCUMENTS

2018/0105162 A1* 4/2018 Katakura ............... B60W 20/00
2018/0313444 A1* 11/2018 Asai ..................... F16H 37/0846
(Continued)

FOREIGN PATENT DOCUMENTS

| CN | 101541612 | 9/2009 |
| CN | 101646884 | 2/2010 |

(Continued)

OTHER PUBLICATIONS

"Office Action of Japan Counterpart Application," with machine English translation thereof, dated Jan. 7, 2020, p. 1-p. 5.
(Continued)

*Primary Examiner* — Tisha D Lewis
(74) *Attorney, Agent, or Firm* — JCIPRNET (57) ABSTRACT

A hydraulic control device and hydraulic control method of a transmission are provided. The hydraulic control device of a transmission, which includes a forward clutch engaged in a Drive range, a reverse brake engaged in a Reverse range, and a switching valve that is able to selectively switch supply of a hydraulic pressure to the forward clutch and the reverse brake, wherein the hydraulic control device receives a shift position of a vehicle on which the transmission is mounted and idling stop information. When the range is switched to the Reverse range from the Drive range during idling stop, and the switching valve is positioned at a position at which a hydraulic pressure is able to be supplied to the reverse brake, rotational speed increase control with a rotational speed of an electric oil pump higher than a normal rotational speed is performed.

5 Claims, 4 Drawing Sheets

(51) Int. Cl.
    *F16H 61/00*         (2006.01)
    *F16H 61/02*         (2006.01)
    *F16H 63/34*         (2006.01)

(52) U.S. Cl.
    CPC ........ *F16H 59/74* (2013.01); *F16H 2059/708* (2013.01); *F16H 2059/746* (2013.01)

(56) References Cited

U.S. PATENT DOCUMENTS

2019/0195343 A1\*   6/2019   Toyota .................... F16H 61/06
2019/0338852 A1\*  11/2019   Nakano .................. F16H 61/66

FOREIGN PATENT DOCUMENTS

| | | | | |
|---|---|---|---|---|
| CN | 102328653 | 1/2012 | | |
| CN | 102356254 | 2/2012 | | |
| CN | 107406069 | 11/2017 | | |
| CN | 108291632 | 7/2018 | | |
| JP | 06193482 A | \* 7/1994 | ............ | F16H 63/40 |
| JP | 2012241785 | 12/2012 | | |
| JP | 2013221556 | 10/2013 | | |
| JP | 2014169720 | 9/2014 | | |
| JP | 2015081571 | 4/2015 | | |
| JP | 2016148379 | 8/2016 | | |

OTHER PUBLICATIONS

"Office Action of China Counterpart Application", dated May 12, 2020, with English translation thereof, pp. 1-15.
Office Action of Japan Counterpart Application, with English translation thereof, dated Jul. 28, 2020, pp. 1-6.

\* cited by examiner

HYDRAULIC CONTROL DEVICE AND HYDRAULIC CONTROL METHOD OF TRANSMISSION

CROSS-REFERENCE TO RELATED APPLICATION

This application claims the priority of Japan patent application serial no. 2018-048121, filed on Mar. 15, 2018. The entirety of the above-mentioned patent application is hereby incorporated by reference herein and made a part of this specification.

BACKGROUND

Technical Field

The disclosure relates to a hydraulic control device and a hydraulic control method of a transmission.

Description of Related Art

In the related art, a belt type continuously variable transmission including a control device configured to control a gear ratio is known (for example, refer to Patent Document 1).

In this type of continuously variable transmission, a parking gear is provided on a back side of a fixed pulley, and in a Park range (P range), when a parking pole is engaged with the parking gear, the state becomes a parking lock state, and driving wheels are prevented from rotating unintentionally.

PATENT DOCUMENTS

[Patent Document 1] Japanese Laid-open No. 2016-148379

Since only a required minimum hydraulic pressure is supplied by an electric oil pump during idling stop, when a Drive range (D range) is switched to a Reverse range (R range) during idling stop, a hydraulic pressure path for a reverse clutch is not filled with a hydraulic oil. Therefore, it is not possible to rapidly engage the reverse clutch, and the responsiveness in the R range is low.

SUMMARY

[1] An embodiment of the disclosure provides a hydraulic control device (for example, a control device of an embodiment; hereinafter the same) of a transmission (for example, a continuously variable transmission 1 of an embodiment; hereinafter the same). The transmission includes a forward clutch (for example, a forward clutch of an embodiment; hereinafter the same) engaged in a D range (for example, a D range of an embodiment; hereinafter the same), a reverse clutch (for example, a reverse brake of an embodiment; hereinafter the same) engaged in an R range (for example, an R range of an embodiment; hereinafter the same), and a switching valve (for example, a switching valve of an embodiment; hereinafter the same) that is able to selectively switch supply of a hydraulic pressure between the forward clutch and the reverse clutch.

The hydraulic control device receives a shift position of a vehicle on which the transmission is mounted and idling stop information indicating whether idling stop for stopping an internal combustion engine mounted on the vehicle is being performed, and wherein, when the range is switched to the R range from the D range during idling stop and the switching valve is positioned at a position at which a hydraulic pressure is able to be supplied to the reverse clutch, rotational speed increase control (for example, a rotational speed increase control of an embodiment; hereinafter the same) with a rotational speed of an electric oil pump (for example, an electric oil pump of an embodiment; hereinafter the same) higher than a normal rotational speed is performed.

[2] In addition, in the embodiment of the disclosure, the switching valve is able to be switched to a P range position at which a hydraulic pressure is prevented from being supplied to both the forward clutch and the reverse clutch, and when a D range position at which a hydraulic pressure is able to be supplied to the forward clutch is switched to the P range position, the switching valve passes through an R range position at which a hydraulic pressure is able to be supplied to the reverse clutch, after the switching valve is switched from the D range position to the R range position, in order to check whether the range may be switched to the P range position immediately, the internal combustion engine waiting for a predetermined waiting time without starting, and during the predetermined waiting time, the rotational speed increase control is started irrespective of whether the switching valve is switched to the P range position.

[3] In addition, the embodiment of the disclosure provides a hydraulic control method of a transmission. The transmission includes a forward clutch engaged in a D range, a reverse clutch engaged in an R range, and a switching valve capable of selectively switching supply of a hydraulic pressure between the forward clutch and the reverse clutch. The method includes:

receiving a shift position of a vehicle on which the transmission is mounted and idling stop information; and performing rotational speed increase control with a rotational speed of an electric oil pump higher than a normal rotational speed when the range is switched to an R range from a D range during idling stop and the switching valve is positioned at a position at which a hydraulic pressure is able to be supplied to the reverse clutch.

DESCRIPTION OF THE EMBODIMENTS

An embodiment of the disclosure provides a hydraulic control device of a transmission that can transmit a driving force rapidly to driving wheels even if a D range is switched to an R range during idling stop.

According to the embodiment of the disclosure, when a rotational speed of the electric oil pump is increased, even if the D range is switched to the R range during idling stop, it is possible to rapidly transmit a driving force.

In such a configuration, since a rotational speed of the electric oil pump is increased until the predetermined waiting time elapses, even if the D range is switched to the R range during idling stop, it is possible to rapidly transmit a driving force.

According to the embodiment of the disclosure, when a rotational speed of the electric oil pump is increased, even if the D range is switched to the R range during idling stop, it is possible to rapidly transmit a driving force.

A transmission and a vehicle in which a hydraulic control device of an embodiment of the disclosure is mounted will be described with reference to the drawings. A continuously variable transmission of the present embodiment is a belt type continuously variable transmission and is mounted horizontally on an FF type vehicle (automobile). Here, the continuously variable transmission to which the control device of the embodiment of the disclosure is applied is not limited to those mounted on an FF type automobile, and even if it is used for other vehicles, the effects of the embodiment of the disclosure can be obtained. For example, the control device of the embodiment of the disclosure can be applied to an FR type automobile, a midship type automobile, and a motorcycle.

Figure 1:
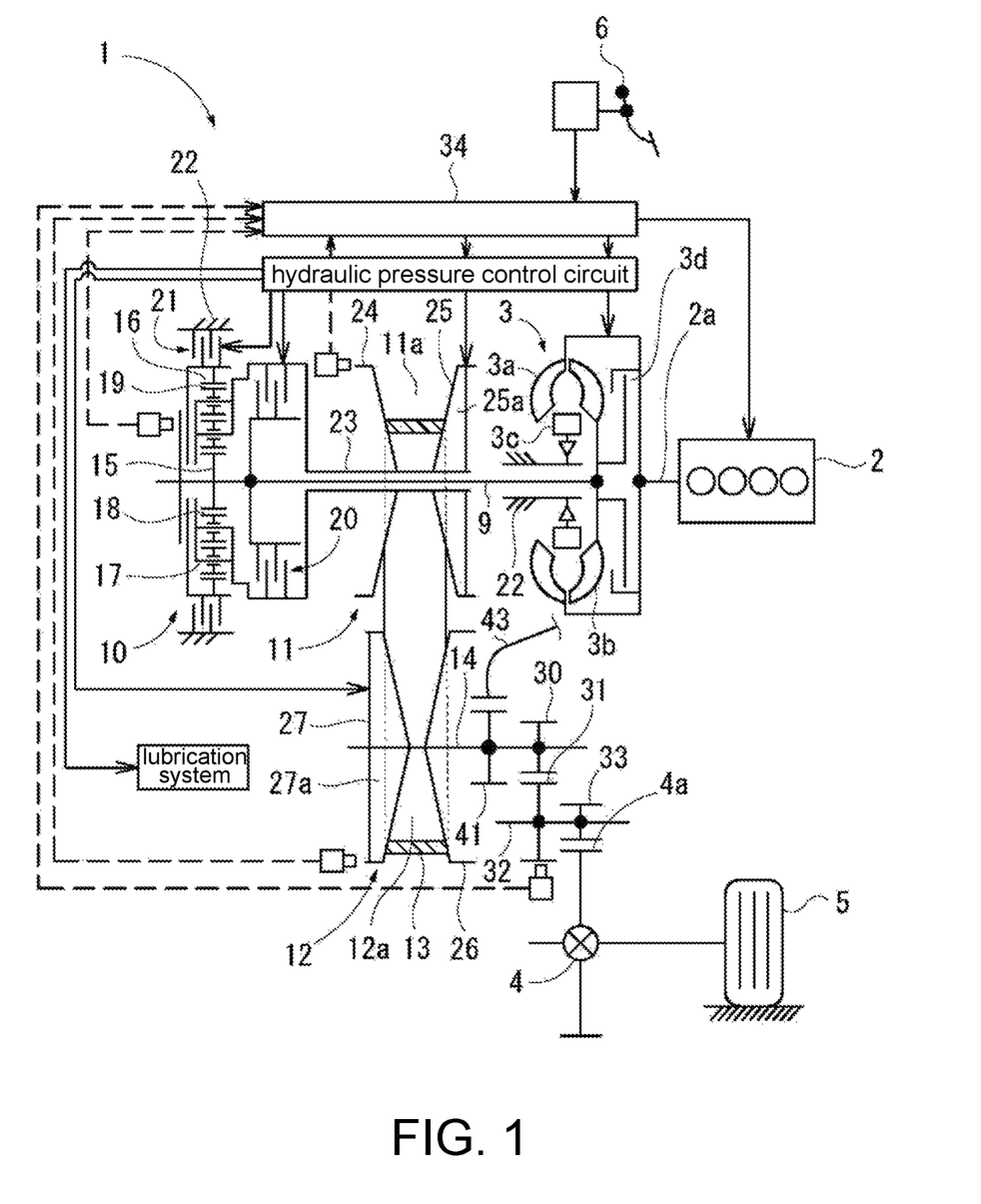
FIG. 1 is an explanatory diagram schematically showing a vehicle in which a hydraulic control device according to an embodiment of the disclosure is mounted.

As shown in FIG. 1, a vehicle (automobile) on which a continuously variable transmission 1 of the present embodiment is mounted includes an internal combustion engine 2 (engine) as a prime mover for driving, a torque converter 3, a differential gear 4, and left and right driving wheels 5.

The internal combustion engine 2 has a throttle valve (not shown) disposed in an intake path. The throttle valve (not shown) is not mechanically connected to the accelerator pedal, but is connected to the accelerator pedal by an electrical signal through a drive by wire mechanism (not shown) including an actuator such as an electric motor, and is opened or closed according to an operation of the accelerator pedal.

Air sucked into the internal combustion engine 2 of which an inflow amount is adjusted by the throttle valve (not shown) passes through an intake manifold, and is mixed with a fuel injected from an injector (not shown) and becomes an air-fuel mixture. When the intake valve of the cylinder is opened, the air-fuel mixture flows into the cylinder. The air-fuel mixture in the cylinder is ignited by a spark plug and burns, and presses a piston. The pressurized piston rotates a crankshaft 2a, the burned air-fuel mixture as an exhaust gas is discharged from the internal combustion engine 2.

A driving force output from the crankshaft 2a of the internal combustion engine 2 is transmitted to the differential gear 4 through the continuously variable transmission 1 and distributed to the left and right driving wheels 5.

The torque converter 3 includes a pump impeller 3a connected to the crankshaft 2a of the internal combustion engine 2, a turbine runner 3b, and a stator 3c, and transmits power through a fluid (oil, hydraulic oil). In addition, the torque converter 3 includes a lock-up clutch 3d, and when the lock-up clutch 3d is engaged, a driving force of the crankshaft 2a can be directly transmitted to the turbine runner 3b without passing through a fluid (oil, hydraulic oil).

The continuously variable transmission 1 includes an input shaft 9, a forward and reverse switching mechanism 10 including planetary gear mechanisms, a drive pulley 11, a driven pulley 12, an endless member 13 formed of a metal belt wound around the drive pulley 11 and the driven pulley 12, and an output shaft 14 disposed parallel to the input shaft 9.

The input shaft 9 is connected to the turbine runner 3b, and a driving force of the internal combustion engine 2 output from the crankshaft 2a is transmitted through the torque converter 3. The drive pulley 11 is pivotally supported on the input shaft 9 so that it is relatively rotatable. The drive pulley 11 is disposed between the forward and reverse switching mechanism 10 and the torque converter 3.

The forward and reverse switching mechanism 10 is constituted by a double pinion type planetary gear mechanism, and includes a sun gear 15, a ring gear 16, a carrier 17, a first pinion 18, a second pinion 19, a forward clutch 20, and a reverse brake 21.

The sun gear 15 is fixed to a protrusion part of the input shaft 9 that protrudes from the side of the torque converter 3 to the opposite side through the drive pulley 11. When the reverse brake 21 is provided in the ring gear 16 and the reverse brake 21 is engaged, the ring gear 16 can be fixed to a transmission case 22. The first pinion 18 and the second pinion 19 are meshed with each other, the first pinion 18 is meshed with the sun gear 15, and the second pinion 19 is meshed with the ring gear 16.

The carrier 17 pivotally supports the first pinion 18 and the second pinion 19 so that they can freely turn and revolve. In other words, the first pinion 18 and the second pinion 19 are rotatably supported by the carrier 17, and the carrier 17 is provided so that it is relatively rotatable together with the first pinion 18 and the second pinion 19 with respect to the sun gear 15 and the ring gear 16.

The forward clutch 20 is connected to the input shaft 9 and the carrier 17 and when the forward clutch 20 is engaged, the sun gear 15 and the carrier 17 rotate together. The carrier 17 is connected to the drive pulley 11.

Both the forward clutch 20 and the reverse brake 21 are hydraulic type friction engagement mechanisms which are friction-engaged by a hydraulic pressure. When the forward clutch 20 is engaged and the reverse brake 21 is released, rotation of the input shaft 9 is directly transmitted to the drive pulley 11 through the carrier 17, and the drive pulley 11 rotates in a direction in which a vehicle (automobile) moved forward.

When the reverse brake 21 is engaged, and the forward clutch 20 is released, the ring gear 16 is fixed to the transmission case 22, the carrier 17 rotates in a direction opposite to that of the sun gear 15, and thereby the drive pulley 11 rotates in a direction in which a vehicle (automobile) moves backward. In addition, when both the forward clutch 20 and the reverse brake 21 are released, the forward and reverse switching mechanism 10 can stop transmission of power between the drive pulley 11 and the input shaft 9.

In the continuously variable transmission 1, power is transmitted due to a frictional force between the drive pulley 11, the driven pulley 12, and the endless member 13. The drive pulley 11 includes a pulley shaft 23 connected to the carrier 17, a fixed drive half pulley 24 fixed to the pulley shaft 23, and a movable drive half pulley 25 that rotates together with the pulley shaft 23 and is movable in an axial direction of the pulley shaft 23.

The movable drive half pulley 25 can approach the fixed drive half pulley 24 when a hydraulic pressure is supplied to a hydraulic chamber 25a, and can be separated from the fixed drive half pulley 24 when oil is discharged from the hydraulic chamber 25a. Thereby, it is possible to adjust the width of a V-shaped pulley groove 11a of the drive pulley 11 formed on a surface opposite to the fixed drive half pulley 24 and the movable drive half pulley 25.

The driven pulley 12 includes a fixed driven half pulley 26 fixed to the output shaft 14, and a movable driven half pulley 27 that rotates together with the output shaft 14 and is movable in the axial direction of the output shaft 14. The movable driven half pulley 27 can approach the fixed driven half pulley 26 when a hydraulic pressure is supplied to a hydraulic chamber 27a, and can be separated from the fixed driven half pulley 26 when oil is discharged from the hydraulic chamber 27a. Thereby, it is possible to adjust the width of a V-shaped pulley groove 12a of the driven pulley 12 formed on a surface opposite to the fixed driven half pulley 26 and the movable driven half pulley 27.

The endless member 13 formed of a metal belt includes a plate-like element having a pair of left and right recesses and a plurality of metal rings. The metal ring is obtained when ends of a maraging steel thin plate are welded to form a tubular shape, subjected to solution treatment, cut to a predetermined width, and then rolled to have a predetermined circumferential length, and subjected again to a solution treatment.

In the continuously variable transmission 1, the widths of the pulley grooves 11a and 12a of the drive pulley 11 and the driven pulley 12 are changed by thrust due to a hydraulic pressure, a winding radius of the endless member 13 changes, and thereby, a gear ratio (a rotational speed of the input shaft 9 (or the pulley shaft 23)/a rotational speed of the output shaft 14) continuously changes.

The output shaft 14 is rotatably supported on the transmission case 22 by a bearing. Referring to FIG. 1, an output gear 30 is provided on the output shaft 14, and the output shaft 14 and the output gear 30 rotate together.

A first intermediate gear 31 is meshed with the output gear 30. The first intermediate gear 31 is fixed to an intermediate shaft 32 disposed parallel to the output shaft 14. In addition, a second intermediate gear 33 is fixed to the intermediate shaft 32. External teeth 4a provided in the differential gear 4 are meshed with the second intermediate gear 33.

A parking gear 41 is fixed to the output shaft 14 so that they rotate together. In addition, a parking pole 43 that can be meshed with the parking gear 41 is provided in the continuously variable transmission 1. The parking gear 41 and the parking pole 43 constitute the parking lock mechanism in the present embodiment.

In addition, the continuously variable transmission 1 includes a control device 34 including electronic units constituted by a CPU, a memory, and the like. The control device 34 receives a predetermined vehicle information signal such as a signal generated when a driver operates a brake pedal 6 (braking operation unit), a vehicle running speed signal, an acceleration signal of an acceleration sensor (gradient angle detection unit), a shift position according to a shift lever operation, and idling stop information such as whether idling stop is performed, and causes a CPU to execute a control program of the continuously variable transmission 1 stored in the memory based on the received signals, and thereby controls operations of the drive pulley 11, the driven pulley 12, the forward clutch 20, and the reverse brake 21.

Figure 2A:
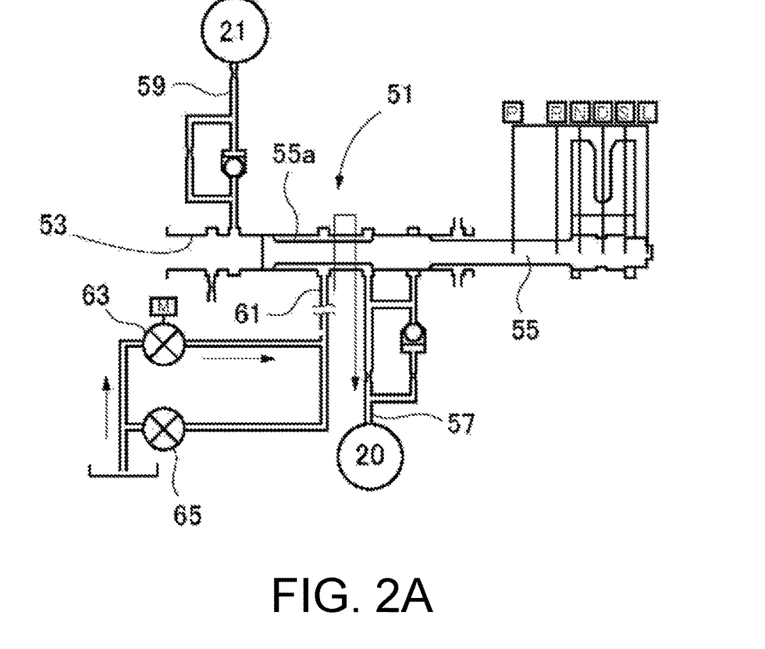
FIG. 2A is an explanatory diagram schematically showing a hydraulic pressure control circuit of the present embodiment and FIG. 2B is an explanatory diagram schematically showing a state in which an R range is selected in the hydraulic pressure control circuit of the present embodiment.
Figure 2B:
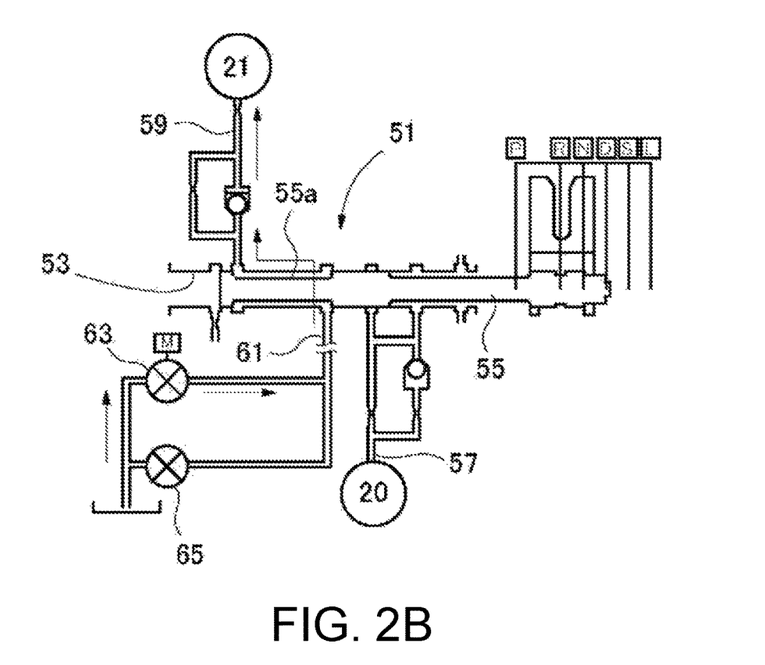

FIG. 2A and FIG. 2B show a part of a hydraulic circuit of the present embodiment. The continuously variable transmission 1 includes a switching valve 51 composed of a manual valve that moves in connection with a shift lever operation of a driver, an electric oil pump 63 (EOP), and a mechanical oil pump 65 that is driven using a driving force of the internal combustion engine 2. Here, while the switching valve 51 is described as a manual valve in the present embodiment, the switching valve of the embodiment of the disclosure is not limited to a manual valve as long as it can selectively supply a hydraulic pressure to the forward clutch and the reverse clutch, and another switching valve may be used. For example, a shift-by-wire type switching valve may be used, and a switching valve that is electrically operated such as a linear solenoid valve may be used.

The switching valve 51 includes a sleeve 53 and a piston 55. A D oil path 57 through which a hydraulic pressure is supplied to a clutch in a Drive range (D range), an R oil path 59 through which a hydraulic pressure is supplied to a clutch in a Reverse range (R range), and a supply path 61 through which a hydraulic pressure is supplied are connected to the sleeve 53.

In the piston 55, an annular groove 55a that can selectively connect the D oil path 57 and the R oil path 59 to the supply path 61 is provided. The piston 55 is positioned at a D range position at which the D oil path 57 and the supply path 61 are connected through the annular groove 55a when the D range is selected. In addition, the piston 55 is positioned at an R range position at which the R oil path 59 and the supply path 61 are connected through the annular groove 55a when the R range is selected.

FIG. 2A shows a state in which the switching valve 51 is positioned at a position in the D range. FIG. 2B shows a state in which the switching valve 51 is positioned at a position in the R range.

A shift lever (not shown) that operates the switching valve 51 of the present embodiment is arranged in the order of a Park range (P range), an R range, an N range, and a D range, and when the D range is switched to the P range, the shift lever always passes through the R range. Therefore, even if the R range is selected, since the range may shift to the P range without change, the control device 34 of the present embodiment performs control such that a delay timer is provided and shift to the R range is awaited only for a predetermined waiting time.

Figure 3:
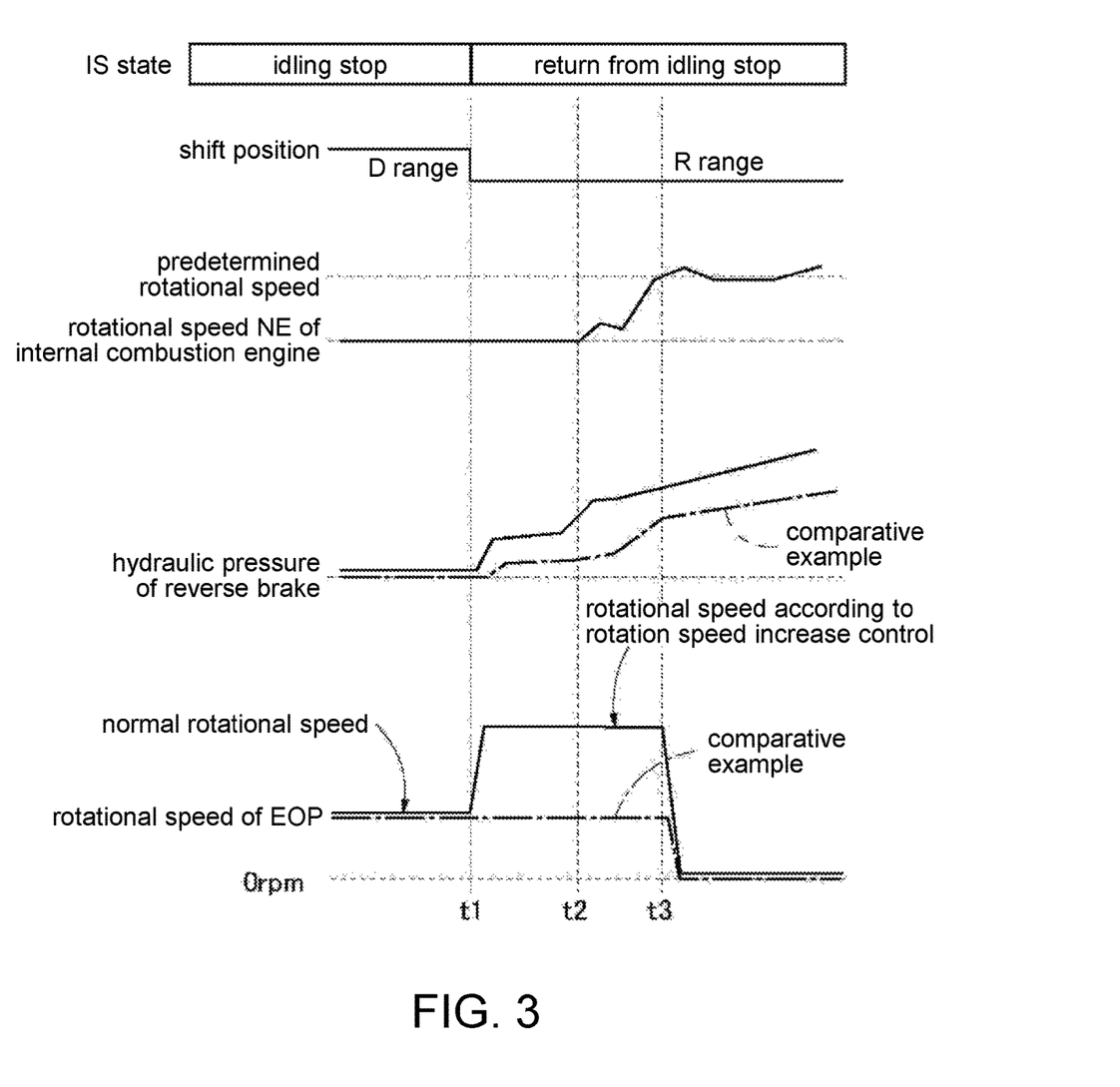
FIG. 3 is a timing chart showing changes in rotational speed of an electric oil pump of the present embodiment.

FIG. 3 is a timing chart of a shift position, a rotational speed NE of the internal combustion engine 2, a hydraulic pressure supplied to the reverse brake 21 (reverse clutch), and an instructed rotational speed of the electric oil pump 63 (EOP) with a horizontal axis as a time axis. Dashed-dotted lines show changes in state when rotational speed increase control is not performed as a comparative example.

During idling stop, the electric oil pump 63 supplies only a required minimum hydraulic pressure in order to minimize wasteful consumption of electric energy. The required minimum hydraulic pressure is appropriately set according to a state of a vehicle, a type of a vehicle, and the like. In the present embodiment, a rotational speed of the electric oil pump 63 when rapid engagement of the reverse brake 21 is not considered is defined as a normal rotational speed.

Figure 4:
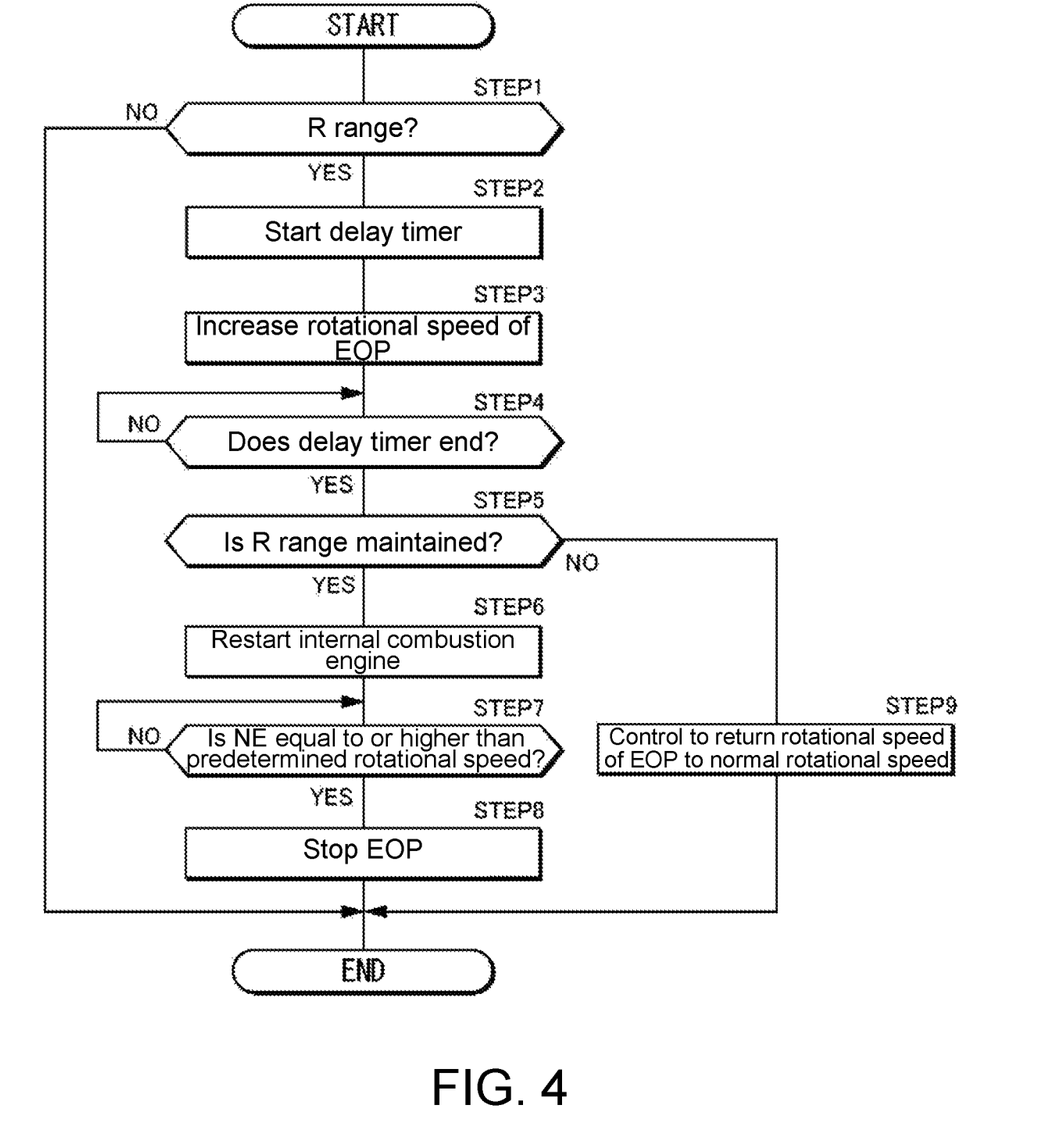
FIG. 4 is a flowchart showing operations of the hydraulic control device of the present embodiment.

FIG. 4 is a flowchart showing operations of the control device 34 of the present embodiment. The control device 34 repeatedly performs the process in FIG. 4 over predetermined control cycles (for example, 10 ms).

Referring to FIG. 4, the control device 34 first checks whether the range is switched to an R range in STEP 1. When the range has not been switched to an R range, the current process ends.

When the range has been switched to an R range in STEP1 (a time t1 in FIG. 3), the process advances to STEP2, and a delay timer for measuring a predetermined waiting time starts. Then, the process advances to STEP3, and rotational speed increase control in which a rotational speed of the electric oil pump 63 (EOP) is made higher than a normal rotational speed is performed. Thereby, when the range is positioned in an R range after the delay timer ends, the reverse brake 21 (reverse clutch) can be immediately engaged, and power of the internal combustion engine 2 can be rapidly transmitted to the driving wheel 5. An amount of rotational speed increased is appropriately set based on a capacity of the reverse brake 21, a structure of the hydraulic circuit, a capacity of the electric oil pump 63, and the like.

Next, the process advances to STEP4, and a delay timer for measuring a predetermined waiting time checks whether a predetermined waiting time has elapsed and the delay timer ends. When the delay timer has not ended, STEP4 is repeated.

When the delay timer has ended in STEP4 (a time t2 in FIG. 3), the process advances to STEP5, and it is checked whether the R range is being maintained. When the R range is being maintained, the process advances to STEP6, the idling stop is terminated, and the internal combustion engine 2 is restarted.

Then, the process advances to STEP7, and it is checked whether a rotational speed NE of the internal combustion engine 2 has reached a predetermined rotational speed that is a rotational speed at which the mechanical oil pump 65 is driven stably. When the predetermined rotational speed has not been reached, the process of STEP7 is repeated.

When it is confirmed that the rotational speed NE is a predetermined rotational speed or higher in STEP7 (a time t3 in FIG. 3), the process advances to STEP8, the mechanical oil pump 65 is driven stably, and a sufficient hydraulic pressure can be supplied by only the mechanical oil pump 65. Therefore, the electric oil pump 63 is stopped, and the current process ends.

When the R range is not being maintained in STEP5 and the range has been switched to a P range, the process advances to STEP9, a rotational speed of the electric oil pump 63 is returned to a normal rotational speed, and the current process ends.

According to the hydraulic control device and the hydraulic control method of the present embodiment, when the D range has been switched to the R range during idling stop, a rotational speed of the electric oil pump 63 is increased. Therefore, even when the D range has been switched to the R range during idling stop, a hydraulic pressure can be immediately supplied to the reverse brake 21, and it is possible to rapidly transmit a driving force to the driving wheel 5.

In addition, since a rotational speed of the electric oil pump is increased until the predetermined waiting time elapses, compared to when waiting is performed without increasing a rotational speed of the electric oil pump 63 until the delay timer elapses, even if the D range has been switched to the R range during idling stop, it is possible to rapidly transmit a driving force.

Here, the continuously variable transmission in which the mechanical oil pump 65 that rotates using a driving force of the internal combustion engine 2 is used has been described in the present embodiment. However, the continuously variable transmission of the embodiment of the disclosure is not limited hereto, and a continuously variable transmission including only an electric oil pump without a mechanical oil pump may be used.

In addition, a device including a delay timer that does not start the internal combustion engine 2 until a predetermined waiting time elapses when the D range has been switched to the R range has been described in the present embodiment. However, the hydraulic control device of the embodiment of the disclosure is not limited thereto. For example, the embodiment of the disclosure can be applied to a device that does not include a delay timer, and performs control such that an internal combustion engine immediately starts.

In addition, while a belt type continuously variable transmission has been described as a transmission in the present embodiment, the transmission of the embodiment of the disclosure is not limited to the belt type continuously variable transmission as long as it has a valve of which a shift position has been switched in the order of a P range, an R range, and a D range, and other transmissions may be used.

What is claimed is:

1. A hydraulic control device of a transmission, which comprises a forward clutch that is engaged in a Drive range; a reverse clutch that is engaged in a Reverse range; and a switching valve that is able to selectively switch supply of a hydraulic pressure between the forward clutch and the reverse clutch, wherein the hydraulic control device receives a shift position of a vehicle on which the transmission is mounted and idling stop information indicating whether an idling stop for stopping an internal combustion engine mounted on the vehicle is being performed, wherein, when the range is switched to the Reverse range from the Drive range during the idling stop and the switching valve is positioned at a position at which a hydraulic pressure is able to be supplied to the reverse clutch, rotational speed increase control with a rotational speed of an electric oil pump higher than a normal rotational speed is performed, and wherein, after the switching valve is switched from the Drive range position to the Reverse range position, the internal combustion engine waiting for a predetermined waiting time without starting.

2. The hydraulic control device of a transmission according to claim 1, wherein the switching valve is able to be switched to a Park range position at which a hydraulic pressure is prevented from being supplied to both the forward clutch and the reverse clutch, and when a Drive range position at which a hydraulic pressure is able to be supplied to the forward clutch is switched to the Park range position, the switching valve passes through a Reverse range position at which a hydraulic pressure is able to be supplied to the reverse clutch, and wherein, during the predetermined waiting time, the rotational speed increase control is started irrespective of whether the switching valve is switched to the Park range position.

3. A hydraulic control method of a transmission, which comprises a forward clutch engaged in a Drive range, a reverse clutch engaged in a Reverse range, and a switching valve capable of selectively switching supply of a hydraulic pressure between the forward clutch and the reverse clutch, the method comprising:

receiving a shift position of a vehicle on which the transmission is mounted and idling stop information indicating whether an idling stop for stopping an internal combustion engine mounted on the vehicle is being performed; and performing rotational speed increase control with a rotational speed of an electric oil pump higher than a normal rotational speed when the range is switched to a Reverse range from a Drive range during the idling stop and the switching valve is positioned at a position at which a hydraulic pressure is able to be supplied to the reverse clutch, wherein, after the switching valve is switched from the Drive range position to the Reverse range position, the internal combustion engine waiting for a predetermined waiting time without starting.

4. The hydraulic control device of a transmission according to claim 1, wherein the transmission further comprises a delay timer for measuring a predetermined waiting time, and wherein, when the range is switched to the Reverse range from the Drive range during the idling stop and the switching valve is positioned at the position at which a hydraulic pressure is able to be supplied to the reverse clutch, the delay timer starts and the rotational speed increase control is performed, and the internal combustion engine is restarted if the R range is being maintained after the delay timer ends.

5. The hydraulic control method of a transmission according to claim 3, wherein the transmission further comprises a delay timer for measuring a predetermined waiting time, and the hydraulic control method comprises:

starting the delay timer and performing the rotational speed increase control when the range is switched to a Reverse range from a Drive range during the idling stop and the switching valve is positioned at the position at which a hydraulic pressure is able to be supplied to the reverse clutch, and restarting the internal combustion engine mounted on the vehicle, which is stopped during the idling stop, if the Reverse range is being maintained after the delay timer ends.

* * * * *